United States Patent
Sanjay

(10) Patent No.: US 8,609,783 B2
(45) Date of Patent: Dec. 17, 2013

(54) ARTICLES HAVING IMPROVED GAS BARRIER PROPERTIES

(75) Inventor: Mehta Sanjay, Spartanburg, SC (US)

(73) Assignee: Invista North America S.A.R.L., Wilmington, DE (US)

( * ) Notice: Subject to any disclaimer, the term of this patent is extended or adjusted under 35 U.S.C. 154(b) by 364 days.

(21) Appl. No.: 12/067,264

(22) PCT Filed: Oct. 6, 2006

(86) PCT No.: PCT/US2006/039316
§ 371 (c)(1),
(2), (4) Date: Mar. 18, 2008

(87) PCT Pub. No.: WO2007/044623
PCT Pub. Date: Apr. 19, 2007

(65) Prior Publication Data
US 2008/0258355 A1    Oct. 23, 2008

Related U.S. Application Data

(60) Provisional application No. 60/724,915, filed on Oct. 7, 2005.

(51) Int. Cl.
*C08G 63/91*    (2006.01)

(52) U.S. Cl.
USPC ........... 525/411; 525/437; 525/450; 528/295; 528/360

(58) Field of Classification Search
USPC .................. 525/411, 437, 450; 528/295, 360
See application file for complete search history.

(56) References Cited

U.S. PATENT DOCUMENTS

| | | | |
|---|---|---|---|
| 4,424,242 A | | 1/1984 | Barbee |
| 4,499,262 A | * | 2/1985 | Fagerburg et al. ............ 528/279 |
| 4,565,851 A | * | 1/1986 | Barbee ......................... 525/437 |
| 4,729,927 A | | 3/1988 | Hirose et al. |
| 5,053,482 A | | 10/1991 | Tietz |
| 6,309,718 B1 | | 10/2001 | Sprayberry |
| 6,673,403 B1 | | 1/2004 | Shiiki et al. |
| 2004/1006572 | | 6/2004 | Cartier et al. |
| 2005/0137356 A1 | | 6/2005 | Hale et al. |
| 2006/0100392 A1 | | 5/2006 | Yamane et al. |
| 2006/0217523 A1 | * | 9/2006 | Tan et al. ...................... 528/361 |
| 2007/0149754 A1 | * | 6/2007 | Bayer et al. ................... 528/272 |

FOREIGN PATENT DOCUMENTS

| | | | | |
|---|---|---|---|---|
| EP | 1582564 | | 7/2004 | |
| EP | 1 548 046 | * | 6/2005 | ........... C08G 63/688 |
| WO | 2005/063846 | | 7/2005 | |
| WO | WO 2005/063846 | * | 7/2005 | ........... C08G 63/688 |

OTHER PUBLICATIONS

Blow Molding Handbook, Munich 1989, pp. 552 to 553.
Sekelik et al, Journal of Polymer Science Part B: Polymer Physics, 1999, vol. 37, pp. 847-857.
Qureshi et al., Journal of Polymer Science, Part B: Polymer Physics, 2000, vol. 38, pp. 1679-1686.
Polyakova et al, Journal of Polymer Science Part B: Polymer Physics, 2001, vol. 39, pp. 1889-1899.

* cited by examiner

*Primary Examiner* — Robert Jones, Jr.
(74) *Attorney, Agent, or Firm* — Womble Carlyle Sandridge & Rice, LLP

(57) ABSTRACT

The present invention relates to a blend of sulfo-modified copolyester wherein the diacid is aromatic or cyclic and polyglycolic acid. The blend of sulfo-modified copolyester and polyglycolic acid can be used to prepare containers with good transparency and high gas barrier properties. The preferred sulfo-modified copolyester composition comprises terephthalic acid, isophthalic acid and 5-sulfoisophthalic acid. A method of preparing a blend of sulfo-modified copolyester and polyglycolic acid is disclosed, as well as master batch processes. The present invention also relates to a method of making a container wherein the sulfo-modified copolyester is blended with the polyglycolic acid at an injection molding machine used to make preforms, which are then blown into bottles.

9 Claims, No Drawings

ARTICLES HAVING IMPROVED GAS BARRIER PROPERTIES

CROSS-REFERENCE TO RELATED APPLICATIONS

This application is a 371 of PCT Application No. PCT/US06/039316, filed on Oct. 6, 2006, which is incorporated herein by reference in its entirety, which in turn claims benefit of priority from U.S. Provisional Application No. 60/724,915 filed Oct. 7, 2005.

BACKGROUND OF THE INVENTION

1. Field of the Invention

This invention relates to a polymer blend comprising an aromatic polyester composition and polyglycolic acid. The polyester composition according to the invention comprises sulfo-modified copolyester. This blend can be formed into articles that have improved gas barrier and good clarity. The invention also relates to various methods of making the blend, including using master batch processes. Additionally, the present invention also contemplates a method of making a preform or container from the blend.

2. Prior Art

In recent years, much activity and invention in the art of polyesters has centered on the development of articles made from polyethylene terephthalate (PET). Containers and films constructed of PET have found wide acceptance in the packaging of food stuffs, medicines, consumer products and in particular carbonated soft drinks.

As longer shelf lives are required and smaller carbonated soft drink containers are being used, PET requires an improvement in gas barrier properties, especially an improvement in carbon dioxide permeability.

One approach has been the use of multilayer bottles containing a layer of a high barrier polymer such as an ethylene-vinyl-alcohol copolymer (EVOH), partially aromatic polyamide, or the like. U.S. Pat. No. 6,673,403 discloses a multilayer container using polyglycolic acid as the barrier layer. U.S. Pat. No. 4,424,242 also discloses a multilayer packaging material using polyglycolic acid as a barrier layer between layers of PET.

U.S. Pat. No. 4,565,851 discloses a blend of 5 to 50% by weight polyglycolic acid and 50 to 95% by weight of PET. However it has been found that these blends form a hazy article.

US Pat. Application No. 2006/0100392 also discloses polyglycolic copolyesters with a minor amount of aromatic polyester resins, preferably 30%.

U.S. Pat. No. 4,729,927 discloses a blend of PET and a copolymer comprising 40 to 95 mole % of ethylene isophthalate units and 5 to 60 mole % polyglycolic acid units. There is no information on the haziness of the bottle.

U.S. Pat. No. 6,309,718 relates to large containers, greater than 200 grams, that contain from 6 to 17 mol. % isophthalic acid. There is no disclosure relating to a blend of this copolyester with polyglycolic acid or a solution to the haze of the resulting blend.

EP 1 582 564 A1 discloses a copolyester of a hydroxy carboxylic acid and an aromatic dicarboxylic acid, exemplified by isophthalic acid, to be blended with a polyester resin. A specific molar ratio range of continuously bonded hydroxy carboxylic acid to isolated hydroxy carboxylic acid units is claimed which improves the transparency and gas permeability compared to the polyester resin.

There is a need for a simple blend of PET copolymer with a high barrier polymer, such as polyglycolic acid, that will give a clear monolayer article having improved gas barrier properties.

SUMMARY OF THE INVENTION

In the broadest sense the invention comprises a blend of sulfo-modified copolyester with polyglycolic acid.

The broadest sense of the present invention also comprises a clear article, container, bottle or film that has improved gas barrier properties than that known in the art.

In the broadest sense the present invention is a method to blend and melt extrude sulfo-modified copolyester with polyglycolic acid.

In the broadest sense the present invention is a method to prepare sulfo-modified copolyester. Later it may be melt extruded with polyglycolic acid.

DETAILED DESCRIPTION OF THE INVENTION

When the word "a" is used it may mean one or it may also mean at least one.

Compositions of the invention comprise: a sulfo-modified copolyester and polyglycolic acid.

The sulfo-modified copolyester comprises at least 75 mole % of polyethylene terephthalate or polyethylene naphthalate, at least 2.5 mole % but not more than 15 mole % of isophthalate or $C_1$-$C_4$-dialkyl isophthalate or 1,4-cyclohexanedimethanol and at least 0.1 mole % but not more than 5.0 mole % of units of the formula (I)

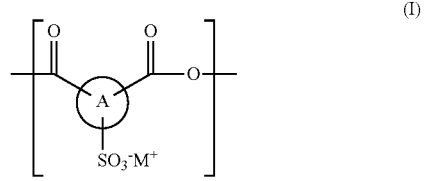

wherein

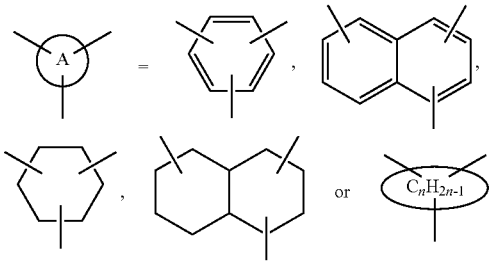

wherein n is an integer from 3 to 10 and
wherein
  $M^+$ is an alkali metal ion, earth alkali metal ion, phosphonium ion or ammonium ion and
wherein the intrinsic viscosity is 0.6 to 1.0, preferably 0.7- to 0.9 and especially preferred 0.75 to 0.89.
Preferably

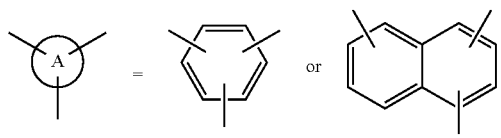

and especially preferred

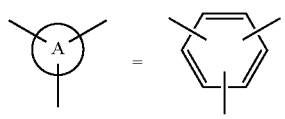

with the attachments preferably in the 1-, 3- and 5-position (for the phenyl ring) and in 2-, 4- and 6-position (for the naphthyl ring), most preferred is 5-sulfoisophthaloyl (prepared from 5-sulfoisophthalic acid).

Preferably $M^+$ is an alkali metal ion, especially preferred $Li^+$, $Na^+$ or $K^+$.

The addition of units of formula (I) into a polyester decreases the natural stretch ratio (NSR) of preforms, see WO2005/063846. The determination of NSR is described in the *Blow Molding Handbook*, Munich 1989, pages 552 to 553. Stretching a preform above its NSR results in increased haze due to microvoids in the bottle sidewalls. To maintain a constant NSR as the concentration of the units of formula (I) increases, an additional concentration of a monomer such as isophthalic acid or 1,4-cyclohexanedimethanol needs to be added to the base copolyester. The preferred range of a 5-sulfoisophthalic acid monomer is about 0.5 to about 5.0 mole %, preferably 0.5 to 3.0 mole %. The corresponding preferred range of isophthalic acid or $C_1$-$C_4$-dialkyl isophthalate or 1,4 cyclohexanedimethanol is 15.0 to 2.5 mole %, preferably 10 to 3 mole %.

The sulfo-modified copolyester (SPEIT), based on copolyethylene terephthalate-isophthalate, according to the present invention is made by reacting a diacid or diester component comprising at least 25 mole % terephthalic acid (TA) or $C_1$-$C_4$ dialkyl terephthalate with a diacid or diester component comprising at least 2.5 mole % but not more than 15 mole % isophthalic acid (IPA) or $C_1$-$C_4$ dialkyl isophthalate and with a diol component comprising at least 40 mole percent ethylene glycol (EG) and with at least 0.1 but not more than 5.0 mole % of a compound according to formula (II):

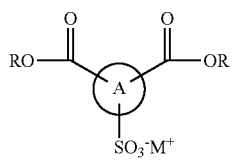

(II)

wherein R is hydrogen, a $C_1$-$C_4$-alkyl or a $C_1$-$C_4$-hydroxyalkyl and $M^+$ and

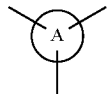

have the meaning given above in formula (I).

The remaining molar amount consists of diethylene glycol (DEG) formed during the polymerization, additional DEG and other comonomers and other additives.

Other comonomers can be other dicarboxylic acids or the ester equivalents, or other diols, all of which are well known to those skilled in the art.

Conventional known additives include, but are not limited to an additive of a dye, pigment, filler, branching agent, reheat agent, anti-blocking agent, antioxidant, anti-static agent, biocide, blowing agent, coupling agent, flame retardant, heat stabilizer, impact modifier, UV and visible light stabilizer, crystallization aid, lubricant, plasticizer, processing aid, acetaldehyde and other scavengers, and slip agent, or a mixture thereof. The mole percentage for all components total 100 mole % of the copolyester.

It is preferred that the diacid component be TA (in this case the process is called PTA process or PTA route), or the dialkyl terephthalate component be dimethyl terephthalate (DMT) (in this case the process is called DMT process or DMT route), and R in the compound according to formula (II) is hydrogen, methyl or hydroxyethylene.

Preferred production of the sulfo-modified copolyester (SPEIT) according to the invention comprises reacting terephthalic acid (TA) (or dimethyl terephthalate—DMT), isophthalic acid (IPA) (or dimethyl isophthalate—DMI) and a compound according to formula (II) with ethylene glycol (EG) at a temperature of approximately 200 to 290° C. forming monomer and water (100 to 230° C. forming monomer and methanol, when using DMT). Because the reaction is reversible, the water (or methanol) is continuously removed, thereby driving the reaction to the production of monomer. The monomer comprises primarily the bishydroxyethyl ester of the employed acids/methyl esters, some monohydroxyethyl ester, and other oligomeric products and perhaps small amounts of unreacted raw materials. During the reaction of TA, IPA, formula-(II)-compound and EG it is not necessary to have a catalyst present. During the reaction of DMT, DMI, formula-(II)-compound and EG it is recommended to use an ester interchange catalyst. Suitable ester interchange catalysts are compounds of Groups Ia (e.g. Li, Na, K), Ia (e.g. Mg, Ca), IIb (e.g. Zn), IVb (e.g. Ge), VIIa (e.g. Mn) and VIII (e.g. Co) of the Periodic Table, e.g. the salts of these with organic acids. Preference is given to those ester interchange catalysts which exhibit some solubility in the reaction mixture. Preferred are salts of: Mn, Zn, Ca, or Mg, in particular manganese, with lower-aliphatic carboxylic acids, in particular with acetic acid.

The amount of Mn, Zn, Mg or other transesterification catalysts employed in the present invention is preferably from about 15 to about 150 ppm metal based on the polymer. Suitable cobalt compounds for use with the present invention include cobalt acetate, cobalt carbonate, cobalt octoate and cobalt stearate. The amount of Co employed in the present invention is from about 10 to about 120 ppm Co based on the polymer. This amount is sufficient to balance any yellowness that may be present in the polymer.

Subsequently, the bishydroxyethyl ester and monohydroxyethyl ester undergo a polycondensation reaction to form the polymer. Suitable catalysts for the polycondensation are compounds of antimony (e.g. $Sb(ac)_3$, $Sb_2O_3$), germanium (e.g. $GeO_2$) and Ti (e.g. $Ti(OR)_4$, $TiO_2/SiO_2$, sodium titanate). Preferred polycondensation catalysts are the antimony compounds.

Alternative sulfo-modified copolyesters of this invention can be prepared in a similar manner by replacing the terephthaloyl moiety with a naphthaloyl moiety, and/or the isophthaloyl moiety with an oxymethylene 1,4-cyclohexylene moiety.

Polyglycolic acid is a known polymeric material that has been described in the literature. U.S. Pat. No. 6,673,403 describes the two methods of preparation, ring-opening polymerization process and polycondensation process.

The polyglycolic acid (PGA) used in the present invention has a melt viscosity, $\eta$ of generally 25 to 10,000 Pa·s, preferably 50 to 5,000 Pa·s, more preferably 50 to 1,000 Pa·s as measured at a temperature of 275° C. and a shear rate of 100 $sec^{-1}$. The PGA is present in a range of from about 1 to about 10 weight % of the composition.

If the melt viscosity, $\eta$ of the PGA is lower than 25 Pa·s, there is a possibility that a melt of the PGA may undergo drawdown upon its melt-molding into a container, resulting in difficulty in melt processing, or the toughness of the resin blend may become insufficient. If the melt viscosity, η of the PGA exceeds 10,000 Pa·s, a higher temperature is required of its melt processing, and there is hence a possibility that the PGA may undergo heat deterioration upon the processing. To minimize the PGA domain size in a blend of PGA in a copolyester, the melt viscosity ratio (at 275° C. and a shear rate of 100 sec$^{-1}$) of the copolyester to PGA should be greater than 1, preferably greater than 2 and more preferably greater than 10.

The blend of the sulfo-modified copolyester and polyglycolic acid is conveniently prepared by adding the two resins at the throat of the injection molding machine that produces a preform that can be stretch blow molded into the shape of the container. The mixing section of the extruder should be of a design to produce a homogeneous blend.

Alternatively the blend can be prepared by using master batches. A master batch containing high amounts of the sulphonic acid of formula (I) and comonomer (isophthalic acid or 1,4-cyclohexanedimethanol) can be prepared. This master batch can be let down to the desired level during blending with a standard polyethylene terephthalate polymer (PET), for the article to be produced, and the polyglycolic acid. This master batch can also be prepared with PGA, which can be similarly let down during blending with a standard PET resin.

These process steps work well for forming carbonated soft drink, water or beer bottles, and containers for hot fill applications, for example. The present invention can be employed in any of the conventional known processes for producing a polyester article such as a container, bottle or film.

Testing Procedures

1. Carbon Dioxide Permeability

Carbon dioxide flux of film samples, or bottle sidewalls, at a fixed percent relative humidity, at one atmosphere pressure, and at 25° C. was measured with a Mocon Permatran-C 4/40 instrument (MOCON Minneapolis, Minn.). A mixture of 98% nitrogen with 2% hydrogen was used as the carrier gas, and 100% carbon dioxide was used as the test gas. Prior to testing, specimens were conditioned in nitrogen inside the unit for a minimum of twenty-four hours to remove traces of atmospheric oxygen dissolved in the PET matrix. Subsequently, carbon dioxide was introduced to the test cell. The test ended when the flux reached a steady state where the carbon dioxide flux changed by less than 1% during a 30 minute test cycle. Calculation of the carbon dioxide permeability was done according to a literature method for permeation coefficients for PET copolymers, from Fick's second law of diffusion with appropriate boundary conditions. The literature documents are: Sekelik et al., *Journal of polymer Science Part B: Polymer Physics*, 1999, Volume 37, Pages 847-857. The second literature document is Qureshi et al., *Journal of polymer Science Part B: Polymer Physics*, 2000, Volume 38, Pages 1679-1686. The third literature document is Polyakova, et al., *Journal of Polymer Science Part B: Polymer Physics*, 2001, Volume 39, Pages 1889-1899.

All permeability values are reported in units of (cc(STP)·cm)/(m$^2$·atm·day)).

2. Intrinsic Viscosity (IV)

Intrinsic viscosity (IV) is determined by dissolving 0.2 grams of an amorphous polymer composition in 20 milliliters of dichloroacetic acid at a temperature of 25° C. and using an Ubbelhode viscometer to determine the relative viscosity (RV). RV is converted to IV using the equation:

$$IV=[(RV-1)\times 0.691]+0.063.$$

3. Color and Haze

The haze of the preform and bottle walls was measured with a Hunter Lab Color Quest II instrument. D65 illuminant was used with a CIE 1964 10° standard observer. The haze is defined as the percent of the CIE Y diffuse transmittance to the CIE Y total transmission. The color of the preform and bottle walls was measured with the same instrument and is reported using the CIELAB color scale, L* is a measure of brightness, a* is a measure of redness (+) or greenness (−) and b* is a measure of yellowness (+) or blueness (−).

4. Isophthalic and 5-sulfoisophthalic acid

The percent isophthalic acid present in the amorphous polymer was determined at 285 nanometers using a Hewlett Packard Liquid Chromatograph (HPLC) with an ultraviolet detector. An amorphous polymer sample was hydrolyzed in diluted sulfuric acid (10 ml acid in 1 liter deionized water) in a stainless steel bomb at 230° C. for 3 hours. After cooling, an aqueous solution from the bomb was mixed with three volumes of methanol (HPLC grade) and an internal standard solution. The mixed solution was introduced into the HPLC for analysis.

The percent 5-sulfoisophthalic acid present in the amorphous polymer was determined by a sulfur analysis.

5. Metal Content

The metal content of the ground polymer samples was measured with an Atom Scan 16 ICP Emission Spectrograph. The sample was dissolved by heating in ethanolamine, and on cooling, distilled water was added to crystallize out the terephthalic acid. The solution was centrifuged, and the supernatant liquid analyzed. Comparison of atomic emissions from the samples under analysis with those of solutions of known metal ion concentrations was used to determine the experimental values of metals retained in the polymer samples.

6. Melt Viscosity

The melt viscosity of the dried polyester resins and blends were measured over a range of shear rates using a Goettfert Rheo-Tester Model 2000 (Goettfert USA, Rock Hill, S.C., USA).

7. PGA Domain Size

A section of the preform was cut perpendicular to the sidewall and embedded in an epoxy resin. Microtomed sections were mounted and scanning electron photomicrographs taken. At least 100 randomly selected PGA domains are measured and the average domain size calculated.

8. Preform and Bottle Process

The copolyester resin of the present invention is typically, dried for 4-6 hours at 170-180° C., blended with PGA, melted and extruded into 24.5 g preforms, using an Arburg single cavity injection molding machine. The NSR of this preform is 12±1. The preform is then heated to about 100-120° C. and blow-molded into a 0.50 liter bottle, at a stretch ratio of about 12.5, using a Sidel SB01 stretch blow molding machine with a pre-blow pressure of approximately 8.5 bar. The bottle sidewalls had an average thickness of 0.24 mm.

The following examples are given to illustrate the present invention, and it shall be understood that these examples are for the purposes of illustration and are not intended to limit the scope of the invention.

Example 1

The polyglycolic acid (PGA) was obtained from Absorbable Polymers International (Pelham Ala., USA). A commercial bottle grade polyester resin (INVISTA 2201, Spartanburg S.C., USA) containing 2.6 mole % isophthalic acid (IPA) and having an IV of 0.82 was used. A copolyester containing 7.5 mole % isophthalic acid and 1.3 mole % 5-sulfoisophthalic acid (SIPA) was prepared by standard methods and had an IV of 0.76.

Blends of the 2 dried copolyesters and the PGA were prepared using a tumble blender and injected molded into 24.5 g preforms. The preforms were stretch blow molded into 0.5 liter bottles. Sections of the sidewall of the bottles were cut. The haze and carbon dioxide permeability (at 70% RH) were measured. The results are set forth in Table 1.

TABLE 1

| Run # | IPA, mole % | SIPA, mole % | PGA, weight % | Haze, % | $CO_2$ Permeability (cc(STP)·cm)/ ($m^2$·atm·day)) |
|---|---|---|---|---|---|
| 1 | 3 | 0 | 0 | 1.7 | 0.712 |
| 2 | 2.9 | 0 | 2.5 | 13.2 | 0.566 |
| 3 | 2.8 | 0 | 5 | 24.8 | 0.199 |
| 4 | 2.6 | 0.1 | 2.5 | 14.1 | 0.402 |
| 5 | 2.2 | 0.3 | 2.5 | 14.7 | n.m. |
| 6 | 1.4 | 0.6 | 2.5 | 14.6 | n.m. |
| 7 | 7.5 | 1.3 | 0 | 1.9 | n.m. |
| 8 | 7.3 | 1.2 | 2.5 | 3.4 | 0.502 |

(n.m.—not measured)

Runs 1-3 are comparative examples representing the prior art of U.S. Pat. No. 4,565,851. These show that even at a low level of 2.5-5 weight % PGA, hazy bottles are formed. In runs 4-6 SIPA is added to the polyester up to 0.6 mole % without reducing the bottle haze. Surprisingly increasing the IPA level above 5 mole % (Runs 7 and 8), and the SIPA level above 1 mole %, significantly reduced the haze of the bottle to a clear level.

Example 2

A series of copolyesters containing 8.7 mole % of isophthalic acid and various concentrations of 5-sulfoisophthalic acid were prepared under standard conditions to be used as master batches. The properties of these resins are set forth in Table 2.

TABLE 2

| Resin | A | B | C |
|---|---|---|---|
| SIPA, mole % | 1.30 | 1.95 | 0 |
| IV, dl/g | 0.74 | 0.68 | 0.86 |
| Melt viscosity, 275° C., 100 $sec^{-1}$, Pa·s | 900 | 1,000 | 900 |

The PGA resin (Purasorb®) was obtained from PURAC America (Lincolnshire, Ill., USA) and had a melt viscosity at 275° C. of 70 Pa·s at 100 $sec^{-1}$.

Dry blends were prepared from a commercial polyester bottle resin (INVISTA 1101, Spartanburg, S.C., USA) containing 2.8 mole % IPA and having an IV of 0.82, with different amounts of the polyester resins A, B and C together with the PGA polymer. These blends allowed a range of combinations of IPA and SIPA concentrations to be studied. These dried blends, after tumble blending, were injection molded into 24.5 g preforms, and the preforms blown into 0.5 liter bottles. The blend resin composition and the resultant bottle side-wall haze values are set forth in Table 3.

TABLE 3

| Run | IPA, mole % | SIPA, mole % | PGA, wt.-% | Haze, %/mm |
|---|---|---|---|---|
| 9 | 2.78 | 0.0 | 0 | 1.8 |
| 10 | 4.20 | 0.32 | 2.5 | 5.0 |
| 11 | 5.67 | 0.65 | 2.5 | 5.6 |
| 12 | 5.67 | 0.97 | 2.5 | 14 |
| 13 | 8.48 | 1.23 | 2.5 | 6.9 |
| 14 | 8.48 | 1.90 | 2.5 | 21.3 |
| 15 | 5.67 | 0.0 | 2.5 | 17 |
| 16 | 8.7 | 0.0 | 2.5 | 17 |

These results confirm that the use of a sulfo-modified copolyester, in addition to increasing the comonomer content (e.g. isophthalic acid), is require to reduce the haze of blends of these copolyesters with PGA. As the amount of SIPA is increased, a corresponding increase in comonomer content is required.

The PGA domain size range of runs 10, 13 and 16 were measured. In run 16, containing 8.7 mole % IPA, and in which no SIPA was added, the PGA domain size was in the range of 100 to 1,500 nm. The addition of 1.6 mole % SIPA in run 13 reduced the domain size range to less than 100 to 500 nm, with greater than 80% of the PGA domains being less than 100 nm. The range of PGA domain size in run 10 was 100 to 1000 nm.

Although particular embodiments of the invention have been described in detail, it will be understood that the invention is not limited correspondingly in scope, but include all changes and modifications coming within the spirit and terms of the claims appended hereto.

What is claimed is:

1. A composition in the form of a clear monolayer article, comprising a blend of: (a) a sulfo-modified copolyester comprising an aromatic or cyclic sulfonated diacid and a comonomer; and (b) polyglycolic acid, wherein said sulfo-modified copolyester comprises a 5-sulfoisophthalic acid monomer in the range of about 1 to about 5 mole % and a comonomer in the range of about 5 to about 15 mole %.

2. The composition of claim 1 in which the comonomer is isophthalic acid or 1,4-cyclohexanedimethanol.

3. The composition of claim 1 in which said sulfo-modified copolyester has an intrinsic viscosity in the range of about 0.6 to 1.0 dl/g.

4. The composition of claim 1, wherein said polyglycolic acid is present in a range of about 1 to about 10 wt. %, based on the weight of the composition.

5. The composition of claim 1 in which the melt viscosity ratio, measured at 275° C. and 100 $sec^{-1}$ of said copolyester and said polyglycolic acid is greater than 2.

6. The composition of claim 1 in which the melt viscosity ratio, measured at 275° C. and 100 $sec^{-1}$ of said copolyester and said polyglycolic acid is greater than 10.

7. The composition of claim 1, wherein said comonomer is isophthalic acid.

8. A method of manufacturing a blend of sulfo-modified copolyester and polyglycolic acid that forms a clear monolayer article, comprising the steps of
a) preparing a master batch of sulfo-modified copolyester by reacting isophthalic acid or $C_1$-$C_4$-dialkyl isophthalate or 1,4-cyclohexanedimethanol, and a compound according to formula (II):

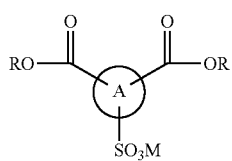

wherein R is hydrogen, a $C_1$-$C_4$-alkyl or a $C_1$-$C_4$-hydroxy-alkyl, and wherein

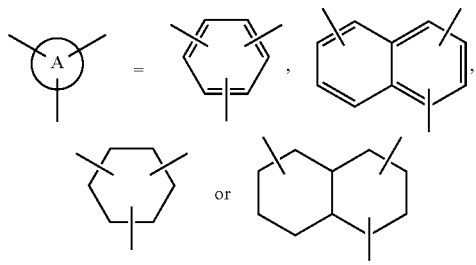

and wherein M is an alkali metal ion, earth alkali metal ion, phosphonium ion or ammonium ion; and b) melt blending to the master batch of step a) polyglycolic acid and a polyester resin, thereby forming said blend of sulfo-modified copolyester and polyglycolic acid having at least 2.0 but not more than 15 mole % isophthalic acid (IPA) or $C_1$-$C_4$-dialkyl isophthalate or 1,4 cyclohexanedimethanol; and at least 0.5, but not more than 5.0 mol % of the compound of formula (II); and about 1 to about 10 wt. % of polyglycolic acid, based on the weight of the blend of sulfo-modified copolyester and polyglycolic acid, wherein said blend forms a clear monolayer article.

9. The method of claim 8, wherein

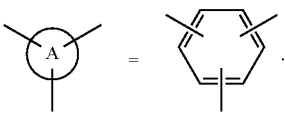

* * * * *